Aug. 6, 1929.  R. F. HALL  1,723,778

AIRPLANE

Filed Oct. 18, 1926

Inventor
Randolph F. Hall
by Albert Fisch
Attorney.

Patented Aug. 6, 1929.

1,723,778

UNITED STATES PATENT OFFICE.

RANDOLPH F. HALL, OF ITHACA, NEW YORK, ASSIGNOR OF ONE-FOURTH TO THEODORE P. HALL, OF WALLINGFORD, CONNECTICUT, AND ONE-FOURTH TO PAUL WILSON, OF ITHACA, NEW YORK.

AIRPLANE.

Application filed October 18, 1926. Serial No. 142,493.

This invention relates to certain improvements in airplanes; and the nature and objects of the invention will be readily recognized and understood by those skilled in the aeronautical art in the light of the following explanation and detailed description of the accompanying drawings illustrating what I at present consider to be the preferred embodiments or aerodynamical and mechanical expressions of the invention from among various other forms, arrangements, combinations and constructions of which the invention is capable within the spirit and scope thereof.
The present invention is based on and embodies the broad and basic principles set forth in and by my United States Letters Patent No. 1,559,091, dated October 27, 1925, and is directed to and provides certain improvements thereon and to certain modifications of the wing or lift surface designs and arrangements disclosed thereby, with the objects and results in view of securing an increased performance and operating efficiency, as well as certain structural advantages in manufacture and in operation and use, of such types of wings or supporting surfaces.

It has been established that with a wing or lift surface embodying superposed airfoils forming an air displacement passageway therebetween, in accordance with the principles of the invention of my above mentioned patent, increased efficiency and improved performance is possible with an enlargement or increase in the depth of the passageway, and an object and characteristic of the present invention is to provide for an enlarged or increased depth passageway between the airfoils without increase of the overall or inclusive depth of the wing section and without structural complications or material increase in the weight of the wing, while retaining a proper factor of safety.

A further characteristic of the invention resides in the design, mounting and operating arrangements of lateral control surfaces or ailerons for wings of the types referred to, with which an increased performance from the wing is obtained by increasing the wing lift at the aileron or control surface portions thereof, and by securing increased and more positive lateral control.

Another characteristic of the invention resides in the structural designs and arrangements of the wings embodying the aforementioned characteristics and features, whereby manufacture thereof is rendered practical and wing structures are produced having the necessary light weight with high factor of safety and durability in operation and use, as well as permitting of easy inspection, repair and replacement.

With the foregoing general characteristics and objects, as well as certain others in view which will be readily apparent from the following description, the invention consists in certain novel features in construction, and in arrangements and combinations of elements, as will be more fully and particularly referred to and specified hereinafter.

Referring to the accompanying drawings in which similar reference characters refer to corresponding parts throughout the several figures thereof:

Fig. 1, is a transverse sectional view, more or less diagrammatical, through a wing embodying features of the invention, and showing the arrangement of fixed lower airfoil with the relatively thin section upper airfoil and air passageway therebetween, and the vanes or flaps at the forward and rear ends in passageway opening positions, the closed positions of the flap to convert the wing to a thick section type being indicated in dotted outline.

Figure 4:
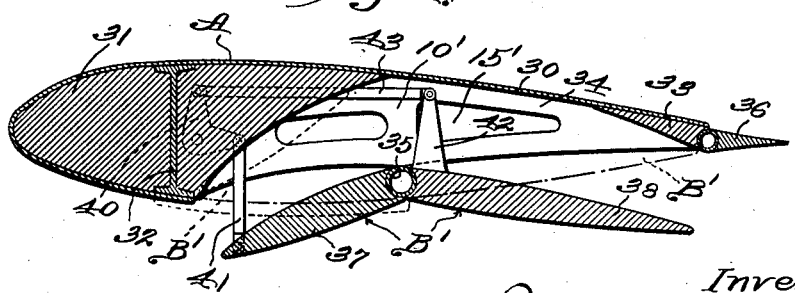

Fig. 4, is a transverse vertical section, more or less diagrammatical, through a modified form of wing in which the forward end of the air displacement passageway is formed to open downwardly through the lower or under side of the wing rearwardly from the leading edge, with an arrangement of lower airfoil providing the vanes or flaps for opening and closing the passageway, and an operating mechanism therefor.

Figure 1:
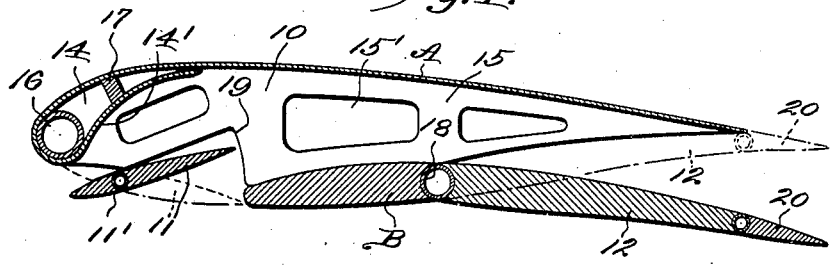

A possible embodiment and aerodynamical expression of certain features of the invention is presented more or less diagrammatically in Fig. 1 of the accompanying drawings, in which a wing or lift surface is formed of the spaced, superposed upper and lower airfoils A and B, respectively, forming the air displacement passage 10 therebetween, with the forward vane or flap 11, and rear flap 12, for opening such passage, or for closing the same to form and convert airfoils A and B into and providing a single wing of the thick section type, in accordance with the principles and for the purposes and results, as fully set forth and explained in the hereinbefore referred to U. S. Patent No. 1,559,091.

According to this invention provision is made for enlarging or increasing the depth of the air displacement passage 10, by which a materially increased efficiency and improved performance results in the operation of the wing at high incidence and passage open condition, but without increasing the overall or inclusive depth of the wing when converted to provide the single section for low incidence, high speed operation. This is accomplished by forming the upper airfoil A of a relatively thin section throughout the major portion of its chord, as by a single thickness of metal, plywood, fibre or the like sheet, although in no way so limited, as other constructions and materials can be employed to secure the desired thin section airfoil. In this manner the passage 10 between airfoils A and B is enlarged by increasing its depth without affecting the overall or inclusive depth of the complete wing so that an efficient wing section is possible with the passage closed in low incidence, high speed operation, while the efficiency of the wing with passage open in high incidence, operation is very materially increased. As further contributing to the efficiency of the air displacement passage and flow therethrough, and as a structural factor, the relatively thin upper airfoil A of the example hereof, is formed with a nose or leading edge section 14 of substantial thickness, and curving downwardly toward the lower airfoil B. This nose or leading edge section 14 decreases in depth or thickness rearwardly to and merges with the main thin section of airfoil A, and carries out the contour or curvature thereof, with the result that the forward or intake end of passage 10 on the upper side thereof presents an upwardly and rearwardly curving surface 14', insuring and causing smooth, unbroken flow of air rearwardly into the passage 10 with a minimum of resistance at the intake end.

Figure 3:
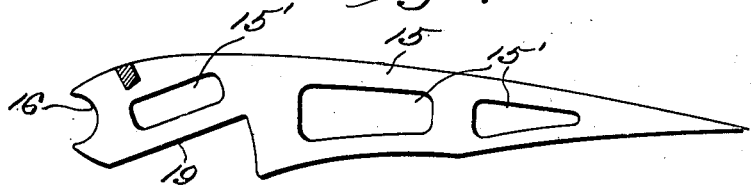
Fig. 3, is a view in side elevation showing a form of wing rib adapted for the wing of Fig. 1.

In the form of the invention of Fig. 1, the lower airfoil B is of considerably less chord than the thin section upper airfoil A and is disposed spaced below the upper airfoil and intermediate the leading and trailing edges thereof. A series of ribs 15 are disposed between and transversely of and across the upper and lower airfoils A and B, spaced at intervals along the span of the wing, with the airfoils fixed thereto and rigidly connected together in proper spaced relation thereby. The ribs 15 extend throughout the chord of the upper airfoil A which is secured over and across the upper edges thereof, with the ribs extending forwardly and rearwardly beyond the lower airfoil B. A single forward wing beam or spar 16 is disposed within the leading edge section 14 of the upper airfoil, across and connecting the forward ends of the ribs 15, each rib being formed with a recess 16' to receive the beam 16, as will be clear by reference to Fig. 3. A longitudinal strip or bar 17 is shown in Fig. 1 in the leading edge section 14' of the upper airfoil A, between the ribs 15 for securing the under covering or skin forming the surface 14' in position on and to the nose section 14'. The lower airfoil B is secured to a rear wing beam or spar 18 at its trailing edge, which spar is secured to and across the lower edges of ribs 15, so that in effect, the airfoil B and spar 18 together provide the rear wing beam for the structure. The ribs 15 are formed with the lightening holes 15' therethrough which also serve and function as passages through which air flowing through the displacement passage 10 may pass, which under certain conditions of yaw in wing operation and flight may be of advantage. If found expedient or necessary the wing structure so formed can be provided with any suitable arrangement of internal brace wires (not shown) to increase the rigidity and strength thereof.

The wing thus provides the spaced upper and lower airfoils having the air displacement passage 10 therebetween opening through the forward end of the wing and discharging at the rear or trailing end thereof. The invention provides for closing the forward and rear ends of the passage 10 and for converting the spaced airfoils into a single wing section. A vane or flap 11, in the present instance of airfoil section, is pivotally mounted on the axis 11' longitudinally of the wing along the open forward end of passage 10, in such a relation to lower fixed airfoil B and the leading or nose edge 14 of upper airfoil A that it can be swung to position, as shown in dotted lines in Fig. 1, across and closing the passage 10, and forming a forward and upward continuation of the lower airfoil B, extending to and joining with the under side of the upper airfoil nose section 14, or can be swung to the position shown in full lines in Fig. 1, to open the passage 10 for air flow therethrough. The forward vane 11 is pivotally mounted on an axis spaced a distance inwardly or rearwardly from the vane leading edge, so as to provide a balanced mounting therefor to assist in swinging the leading edge of the vane downwardly to open position, and upwardly to closed position, against the airflow, although the invention is not limited to such mounting. The wing ribs 15 are cut away rearwardly and upwardly from the pivotal axis 11', of vane 11 to provide the recesses 19 to receive and permit the rear or trailing portion of the vane to swing upwardly in passage opening position, as clearly shown in Figs. 1 and 3 of the drawings.

A rear flap 12 is mounted pivotally along the trailing edge of lower airfoil B at the rear wing beam 18, and in the example here of extends rearwardly from and as a continuation and part of the lower airfoil, to and terminating at its trailing edge substantially beneath and in line with the trailing edge of the upper airfoil A. The rear flap 12 is swingable downwardly to the position shown in full lines in Fig. 1 to open the passage 10, which is continued between the flap 12 and upper airfoil A to discharge between the spaced trailing edges thereof; and is swingable upwardly to position across and closing the passage 10, as shown in dotted outline in Fig. 1. In the passage closing position the rear flap 12 is raised to form a continuation of lower airfoil B, joining and merging at its trailing edge with the trailing edge of the upper airfoil, and with forward vane 11 in closed position forms or converts the spaced airfoils A and B into a single airfoil or wing of the thick section type. A lateral control surface or aileron 20 is in the present instance pivotally mounted at the desired location on and from the rear flap 12 and movable therewith so as to be operable and effective for control of the wing with the flap closed or open. Any suitable or desired operating mechanism (not shown) is provided for opening and closing the forward vane 11 and rear flap, operating to either simultaneously open and close the same or permit of their being independently operated.

With the wing of Fig. 1 in flight operation under high incidence and low speed conditions, forward vane 11 and rear flap 12 are swung to open positions which results in displacement of air rearwardly and downwardly through passage 10 and a material increase in the lift of the wing, as well as increasing the "critical" angle of the wing, with the various advantages and results derived thereby, as will be understood by those skilled in this art. Under low incidence and high speed flight operation, forward vane 11 and rear flap 12 are swung to closed positions and the wing is converted to a single relatively thick section type having a section and characteristics to develop an efficient lift/drag value. Structurally the wing design of Fig. 1 is simple and of relatively light weight, enabling practical low cost production, while in operation and use the construction is such that internal inspection of the wing can be readily made at any time. One of the flight characteristics of the design and construction of the wing of Fig. 1, is a slight movement of the center of pressure when the passage 10 is open or closed by the flaps 11 and 12, which is of advantage structurally as well as aerodynamically. The wing of Fig. 1 in the stalling or spinning condition is very efficient as a biplane, due to the design and arrangement thereof, as described.

Figure 2:
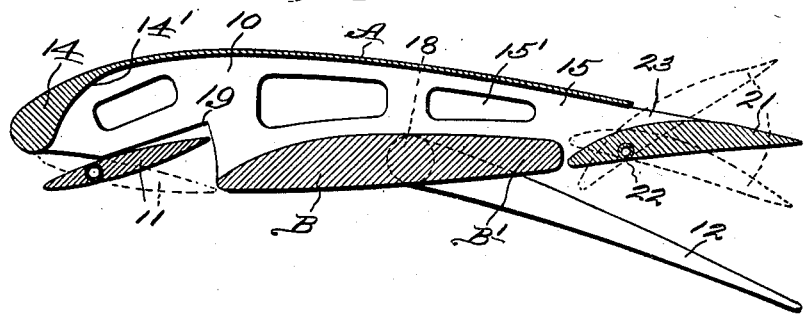
Fig. 2, is a transverse vertical section, more or less diagrammatical, showing another form of wing of the invention, in which ailerons or lateral control surfaces are mounted on the fixed lower airfoil for cooperation with the wing air displacement passageway.

A lateral control surface or aileron mounting for a wing of the type of Fig. 1, is more or less diagrammatically illustrated in Fig. 2 of the drawings, by which the general performance and efficiency of the wing is increased, and the control thereof rendered more positive and responsive. The wing consists of the thin section upper airfoil A with the lower airfoil B having the passage 10 therebetween controlled by vane 11 and flap 12, as previously described with reference to Fig. 1. The rear flap 12 terminates a distance inwardly from the wing tip, and the chord of the lower fixed airfoil B is increased rearwardly to form the extension B' thereof between wing flap 12 and the wing tip, as will be clear by reference to Fig. 2. The leading edge construction with the forward end of passage 10 and forward vane 11 is extended outwardly a distance across the lower airfoil B and the rearward extension B' so that the passage 10 extends over a portion of lower airfoil B—B'.

A lateral control surface or aileron 21 is disposed to the rear of and in substantial continuation of the lower airfoil extension B', between the outer end of rear flap 12 and the wing tip, and extends rearwardly to the wing trailing edge. The aileron 21 is preferably, although not so limited, of the so-called balanced type, which in the present example is secured by pivotally mounting the aileron for vertically swinging movement on an axis 22 spaced a distance rearwardly from the leading edge of the aileron, the aileron being hinged or pivoted to and supported from lower airfoil B—B'. The upper, thin section airfoil A has the skin or covering of which formed cut away a distance inwardly from the trailing edge thereof, above the aileron 21, and terminating at approximately the vertical plane of the aileron pivot or axis 22, so that with the aileron in normal inoperative position forming a trailing portion of airfoil extension B', a gap or passage 23 is provided between the aileron and airfoil A in rearward continuation of the air displacement passage 10 of the wing. The aileron 21 is operated for vertical swinging movement on pivot or axis 22 by any of the usual control operating means or mechanism familiar in the art.

By the foregoing aileron mounting, with the wing in converted, normal low incidence high speed operation with vane 11 closing passage 10, the aileron 21 functions in the usual manner as a lateral control surface. In operation with the forward vane 11 in position opening passage 10, upward movement of aileron 21 tends to close or decrease the gap or outlet 23 from passage 10, and thus decreases the lift and increases the drag on the proper wing with corresponding increase in the control action and effect of the aileron, while downward movement of the aileron 21 tends to increase gap 23 and the discharge opening from passage 10 and thereby properly decrease the drag with increase in the lift. The aileron mounting as shown increases the lift of the aileron portion of the wing and hence increases the total lift developed by the wing, and with the increased lateral control efficiency, very materially contributes to increased wing performance and efficiency. With the wing disclosed in a stall, when most required, the aileron and control response therefrom is very effective, and this effectiveness is further improved and the lift of the wing increased with the forward vane 11 open for air displacement through passage 10 and gap 23.

The forward vane 11 in front of the aileron 21 can be a part of and operated with the vane 11 which is disposed at the forward end of passage 10 ahead of the rear flap 12, or that portion of vane 11 controlling passage 10 ahead of the aileron can be a separate element independently controlled. While the aileron mounting is shown applied to a convertible wing of the type of Fig. 1 it is capable and intended for general application to any and all forms of wings or lift surfaces, or can be employed with a wing having a passageway and forward end opening and closing means solely coextensive with the aileron or control surface, as will be obvious to those skilled in the art and contemplated and included in the invention. Operating mechanism (not shown) of any desired or familiar type can be employed for the aileron 21, and the forward vane 11 can be operatively coupled with the aileron so as to be opened when the aileron is moved from the normal position, or the aileron and vane can be independently operated or controlled. Further, where found expedient the vane 11 forward of the aileron 21 can be eliminated to leave the passage 10 which passes over aileron 21 permanently open.

A wing embodying the invention and presenting a modified design and arrangement of air displacement passage, is shown by Fig. 4 of the drawings. An upper airfoil A' is provided having a thin intermediate section 30 and a deep forward and leading edge portion 31 of a depth or thickness equal to the depth of the converted wing. A forward wing beam or spar 32, in the form of an I beam, is provided in the deep forward section 31 and the forward section is inclined on its under side from a point adjacent beam 32, upwardly and rearwardly to and joining their section 30. A rear or trailing edge section 33 is also formed on upper airfoil A', which section decreases in depth forwardly to and joins section 30 of the airfoil. A series of ribs 34 are spaced at intervals along the span, transversely of airfoil A', and extending between forward section 31 and trailing section 33, across the space therebetween. A rear wing beam or spar 35 is fixed across the under sides or ribs 34 disposed below the thin section 30 and between the forward and rear sections 31 and 33, the ribs 34 being formed with lightening holes or air passages 15' therethrough in the space between the forward and rear sections of the airfoil. A lateral control surface or aileron 36 is pivotally mounted to and extending rearwardly from the trailing edge of upper airfoil A', for operation in the usual manner by any suitable mechanism (not shown).

According to the form of the invention of Fig. 4, the lower airfoil B' is formed of a forward flap 37 and a rear flap 38 pivotally mounted on the rear wing beam 35 and extending forwardly and rearwardly therefrom, respectively. The forward flap 37 extends forwardly to and in raised position joins with the lower rear side of the thick forward section of upper airfoil A', and the rear flap 38 in raised position extends to and joins with the trailing edge section 33 of the upper airfoil, thus closing the space or air displacement passage 10' between the upper airfoils and these flaps spaced below the thin section 30 thereof, and forming with the upper airfoil A' a single wing of relatively thick section type. The raised position of flaps 37—38 forming lower airfoil B' is shown by dotted lines in Fig. 4. In lowered position as shown in full lines in Fig. 4, the forward and rear ends of space or passage 10' are opened, and an upwardly, rearwardly and downwardly extending displacement passage is formed through the wing between upper airfoil A' and the flaps 37—38 which in lowered position form the deeply cambered lower airfoil B'. It will be noted that by the foregoing design and construction an air displacement passage 10' is formed through the wing with its forward or air inlet end disposed spaced a distance rearwardly from the leading edge section of the wing and opening through the lower or under side thereof, so that when open the tendency of the air flow is to pass the inlet without entry, but the lowered forward flap 37, together with the usual increase in the angle of attack of the wing with the passage open causes entry and flow of air rearwardly through the displacement.

A form of operating mechanism is disclosed in Fig. 4, for simultaneously swinging flaps 37—38 upwardly to wing converting and passage closing position, or downwardly to passage opening position. A bell crank 40 is pivotally mounted in vertical position in the forward thick section 31 of upper airfoil A', and its horizontally disposed arm is pivotally connected by a depending link 41 with the flap 37 adjacent the leading edge thereof. A vertically disposed crank or control mast 42 is secured extending upwardly into passage 10' from the flap 38 adjacent the leading edge thereof, and a link 43 is pivotally connected between mast 42 and the vertical arm of bell crank 40. Thus, by rocking bell crank 40 forwardly the flaps 37—38 are raised simultaneously to passage closing, wing converting position, and by rocking the same rearwardly these flaps are simultaneously lowered to passage opening position. The flight operation and use of the wing of Fig. 4 is similar to that described with reference to Figs. 1 and 2. For low incidence high speed flight, the flaps 37 and 38 forming lower airfoil B' are raised to convert the wing to a single relatively thick section type, and for high incidence, maximum lift operation the flaps are lowered to open passage 10' for displacement of air rearwardly and downwardly therethrough.

A modified form of nose flap and an external rib member necessitated thereby, are indicated by the dotted lines in Fig. 4.

By the invention an airplane supporting surface or wing is provided in which high efficiency is obtained through an increase in the lift developed at high angles of incidence while retaining in the wing the desired characteristic of high lift/drag value at low incidence through the convertible features of the invention. Structurally the wings disclosed herewith are capable of low weight and high safety factor, and can be practically manufactured and are readily inspected in use with resulting minimum possibility of failure and low cost of upkeep. The wings constructed with the deep leading edge section of the upper airfoil, as shown in Fig. 4, due to the deep forward beam lend themselves to internal trussing as will be recognized by those skilled in this art.

In the appended claims the term "airplane wing" is employed in a broad, generic sense to include any and all lift surfaces or aerodynamic elements, symmetrical or non-symmetrical in the base section and in any cellule combinations thereof, having or embodying the general characteristics of lift through reaction of air thereon.

No claim is herein made to the aileron or lateral control surface mounting and arrangement disclosed in Fig. 1 of the drawings and described herein, as such aileron or control surface mounting and arrangement is disclosed and claimed in my pending application Serial No. 343,225, filed February 27, 1929, as a division of the present application.

It is also evident that various other changes, modifications, substitutions and variations, than those above referred to, might be resorted to without departing from the spirit and scope of my invention, and hence do not wish or intend to limit myself to the exact and specific disclosures hereof.

Desiring to protect my invention in the broadest manner legally possible, what I claim is:

1. An airplane wing embodying superposed airfoils spaced apart to form an air displacement passage therebetween, means for closing said passage to convert the airfoils to a single wing section of substantially unbroken contour, and one of said airfoils of relatively thin section with respect to the other of said airfoils.

2. An airplane wing embodying superposed airfoils spaced apart to form an air displacement therebetween, means for closing the forward and rear ends of said passage to convert the airfoils to a single wing section, and the upper airfoil of relatively thin section with respect to the lower airfoil.

3. An airplane wing embodying superposed airfoils spaced apart to form an air displacement passage therebetween, means for closing said passage to convert the airfoils to form a single wing section of substantially unbroken contour, and one of said airfoils of relatively thin section to secure a maximum depth of air displacement passage without increase in the total depth of the wing.

4. An airplane wing embodying superposed spaced airfoils to form an air displacement passage therebetween, a series of transverse ribs spaced at intervals along the span of the wing, between and connecting said airfoils, a forward wing beam in the upper airfoil, and a rear wing beam in the lower airfoil, said beams connected to said ribs.

5. An airplane wing embodying spaced superposed airfoils forming an air displacement passage therebetween, a series of transverse ribs between and connecting said airfoils, the upper of said airfoils formed and defined by a relatively thin covering secured to and across the ribs, said covering terminating in a downwardly and forwardly extending leading edge section having substantial thickness, and a forward beam for the wing mounted in said leading edge section across and connecting said ribs.

6. An airplane wing embodying spaced superposed airfoils forming an air displacement passage therebetween, transverse ribs between and connecting said airfoils at spaced intervals along the span, the upper airfoil formed by a relatively thin covering secured to and across the ribs, said covering terminating in a forwardly and downwardly extending leading edge section of substantial thickness, and the lower airfoil having its leading edge terminating and spaced a distance rearwardly of said upper airfoil leading edge section.

7. An airplane wing embodying spaced superposed airfoils forming an air displacement passage therebetween, transverse ribs between and connecting said airfoils at spaced intervals along the span, the upper airfoil formed and defined by a relatively thin covering secured to and over said ribs, said covering terminating in a downwardly extendng leading edge section having substantial thickness, the lower airfoil of less chord than the upper airfoil, a vane pivoted between and extending longitudinal of the forward open end of the air displacement passage for movement to position opening said passage, and to position across and connecting the upper and lower airfoil leading edges to close said passage, and a rear-flap pivotally mountd on and extending from the lower airfoil for downward movement opening the rear end of said passage and for upward movement closing the passage and connecting the lower airfoil with the trailing edge portion of the upper airfoil.

8. An airplane wing embodying spaced superposed airfoils forming an air displacement passage therebetween, longitudinal beam members in said airfoils, and a series of spaced transverse rib members disposed at intervals along the span of the wing between and connecting the airfoils and said longitudinal beam members.

9. An airplane wing embodying spaced, superposed airfoils forming an air displacement passage therebetween, the upper airfoil including a forwardly located longitudinal beam, the lower airfoil including a rearwardly located beam, and a series of transverse rib members spaced at intervals along the span between and connecting said airfoils, the longitudinal beams of the upper and lower airfoil forming the forward and rear longitudinal beams, respectively for the wing.

10. In an airplane wing having an air displacement passage therethrough, a lateral control surface pivotally mounted across the rear end of said passage for vertical swinging movement, said surface extending above the upper surface of the wing and tending to close said passage when raised, and extending below the lower surface of the wing and opening the passage when lowered.

11. In an airplane wing embodying spaced superposed airfoils forming an air displacement passage therebetween, a vane pivotally mounted at the forward end of said passage for opening and closing the same, said vane in closed position connecting the leading edges of said airfoils, a rear flap pivotally mounted on the lower airfoil in rearward continuation thereof for opening and closing the rear end of said passage, the rear flap terminating a distance inwardly from the wing tip, and a lateral control surface pivotally mounted on and extending rearwardly from the lower airfoil between the rear flap and the wing tip, and said lateral control surface openable independently of the rear flap and when swung to raised positions partially closing the passage adjacent thereto, and in lowered positions opening the same.

12. In an airplane wing having an air displacement passage therethrough discharging adjacent the trailing edge of the wing, a lateral control surface for the wing operatively mounted at the discharge end of said passage and extended beyond the wing trailing edge.

13. In an airplane wing having an air displacement passage therethrough discharging adjacent the trailing edge of the wing, a lateral control surface for the wing pivotally mounted disposed at the discharge end of the passage, said control surface extending beyond the wing and partially closing said passage when swung upwardly while opening the passage when swung downwardly.

14. In an airplane wing having an air displacement passage therethrough, a lateral control surface for the wing pivotally mounted at the discharge end of such passage for vertical movements, said control surface extended beyond the trailing edge of the adjacent portion of the wing and partially closing said passage when swung upwardly, while opening the passage when swung downwardly from upwardly swung position.

15. In an airplane wing embodying spaced airfoils forming an air displacement passage therebetween, a rear flap pivotally mounted on the lower airfoil in rearward continuation thereof for opening and closing the rear end of said passage, said rear flap terminating a distance inwardly from the wing tip, and a control surface pivotally mounted and extending rearwardly from the lower airfoil between the rear flap and the wing tip, said control surface partially closing the passage when swung to raised positions.

16. In an airplane wing embodying spaced, superposed airfoils forming an air displacement passage therebetween, a lateral control surface mounted to the rear and substantially in the plane of the lower airfoil, said control surface in maximum raised wing depressing position extending upwardly across and partially closing said passage to restrict air discharge from the passage and reduce the lift developed by the wing, and said control surface in lowered wing elevating positions opening said passage to increase discharge of air from the passage and increase the lift developed by the wing.

17. In an airplane wing having an air displacement passage extending rearwardly therethrough, the combination with a flap member for opening and closing the discharge end of the said passage, of a lateral control surface at the discharge end of the passage extending along a portion of the width of said passage, said control surface in raised wing depressing positions extending across and restricting air discharge from said passage, and in lowered wing elevating positions opening the passage to increase air discharge therefrom, the said control surface and flap member independently operable.

18. In an airplane wing, said wing formed with an air inlet through the under side of the wing adjacent the leading edge thereof for flow of air into the wing, means for forcing air into said inlet, and said wing provided with an air discharge through the upper side of the wing spaced forwardly from but adjacent the trailing edge portion of the wing for discharging air from within the wing above said trailing edge portion of the wing.

19. In an airplane wing formed with an air displacement passage therein having its inlet through the lower surface of the wing adjacent the wing leading edge, a flap member normally closing said inlet, said member swingable outwardly to position projected downwardly from the under surface of the wing to open the passage inlet and force air therethrough into said passage, and said wing provided with a discharge outlet from said displacement passage through the upper surface of the wing spaced forwardly from but adjacent to the trailing edge portion of the wing for discharging air from the displacement passage rearwardly above said trailing edge portion with said flap member in inlet opening position.

Signed at Ithaca, New York, this 16th day of October, 1926.

RANDOLPH F. HALL.